United States Patent
Choi et al.

[11] Patent Number: 5,193,088
[45] Date of Patent: Mar. 9, 1993

[54] HIGH SPEED ATM CELL SYNCHRONIZING SWITCHING APPARATUS

[75] Inventors: Jun K. Choi, Jungku; Mun K. Choi, Seoku; Kyung S. Kim, Yusongku; Tae S. Jeong; Young S. Shin, both of Daedukku, all of Rep. of Korea

[73] Assignee: Electronics and Telecommunications Research Institute, Daejeon, Rep. of Korea

[21] Appl. No.: 720,005

[22] Filed: Jun. 24, 1991

[30] Foreign Application Priority Data

Jun. 27, 1990 [KR] Rep. of Korea .................. 1990-9576

[51] Int. Cl.$^5$ .......................... H04J 3/26; H04L 12/56
[52] U.S. Cl. ..................................... 370/60; 370/58.2; 370/92
[58] Field of Search .................... 370/60, 94.1, 58.1, 370/58.2, 91, 92

[56] References Cited

U.S. PATENT DOCUMENTS

| | | | |
|---|---|---|---|
| 4,947,388 | 8/1990 | Kuwahara et al. | 370/94.1 |
| 4,956,839 | 9/1990 | Torii et al. | 370/60 |
| 5,062,106 | 10/1991 | Yamazaki et al. | 370/60 |

FOREIGN PATENT DOCUMENTS 01256246  10/1989  Japan .
WO88/05982  8/1988  PCT Int'l Appl. .

*Primary Examiner*—Douglas W. Olms
*Assistant Examiner*—Min Jung
*Attorney, Agent, or Firm*—Blakely, Sokoloff, Taylor & Zafman

[57] ABSTRACT

A high speed ATM cell synchronizing switching apparatus is disclosed, and the apparatus includes: a plurality of ATM cell inputting circuits 1 for receiving optical ATM signals; a routing control circuit 2 for receiving address information; a cell gate circuit 3 for transmitting the inputted cells synchronously; a switching information tabling circuit 4 for switching the switching information; and a switching matrix circuit 5 for receiving and outputting the switching control information and the cell data information.

5 Claims, 7 Drawing Sheets

HIGH SPEED ATM CELL SYNCHRONIZING SWITCHING APPARATUS

FIELD OF THE INVENTION

The present invention relates to an ATM(Asynchronous Transfer Mode) cell switching apparatus recommended by the international standard organization (CCITT) as an optical band transmitting mode. Particularly, it relates to a high speed ATM cell synchronizing switching apparatus having a switching memory.

BACKGROUND OF THE INVENTION

When ATM cells are transmitted through a line requiring transmitting speed over 155.52 Mbps, a high speed switching apparatus is required to be switched in real time for each cell. However, in the conventional timedivision switching apparatus for such high speed cell switching, the switching path allocation line and the information transmission line of subscribers are different each other. Therefore, the apparatus is not suitable for switching such short messages as ATM cells at high speed in real time. Furthermore, the existing proposal entiled "Self Routing Switching Apparatus" (Patent No. J01256246 A89/10/12 8947) makes the construction of the system difficult and requires high manufacturing cost since it processes parallely with using buffer memories. There is another proposal (Patent No. WO8805982 A 88/08/11 8823) such that the ATM cell with a control signal needs to include routing information for switching and a complicated internal protocol is required to insert the routing information into the input message. Moreover, the proposal requires to maintain timing not only between the different input modules of the parallel input, but also between the different internal modules of the high speed processing system. Thus, the conventional high speed ATM cell switching apparatuses have the disadvantages described above.

SUMMARY OF THE INVENTION

The present invention is intended to overcome the above disadvantages of the conventional apparatuses.

Therefore, the object of the present invention is to provide a high speed ATM cell synchronization switching apparatus by selecting a switching path in real time for each cell unit, when the high speed ATM cells are transmitted.

To achieve the above object, the apparatus of the present invention includes: ATM cell input means to input optical ATM signals; a routing control means connected to plurality of the ATM cell input means to receive address data and; a cell gate means connected to the plurality of the ATM cell input means and to the routing control means to transmit the inputted cells synchronously; a switching information tabling means connected to the routing control means to switch the switching information; and a switching matrix means connected to the switching information tabling means and to the cell gate means to receive and output switching control information and cell data information.

BRIEF DESCRIPTION OF THE DRAWING

The above object and other advantages of the present invention will become more apparent by describing the preferred embodiment of the present invention in detail with respect to the attached figures.

DESCRIPTION OF THE PREFERRED EMBODIMENT

Figure 1:
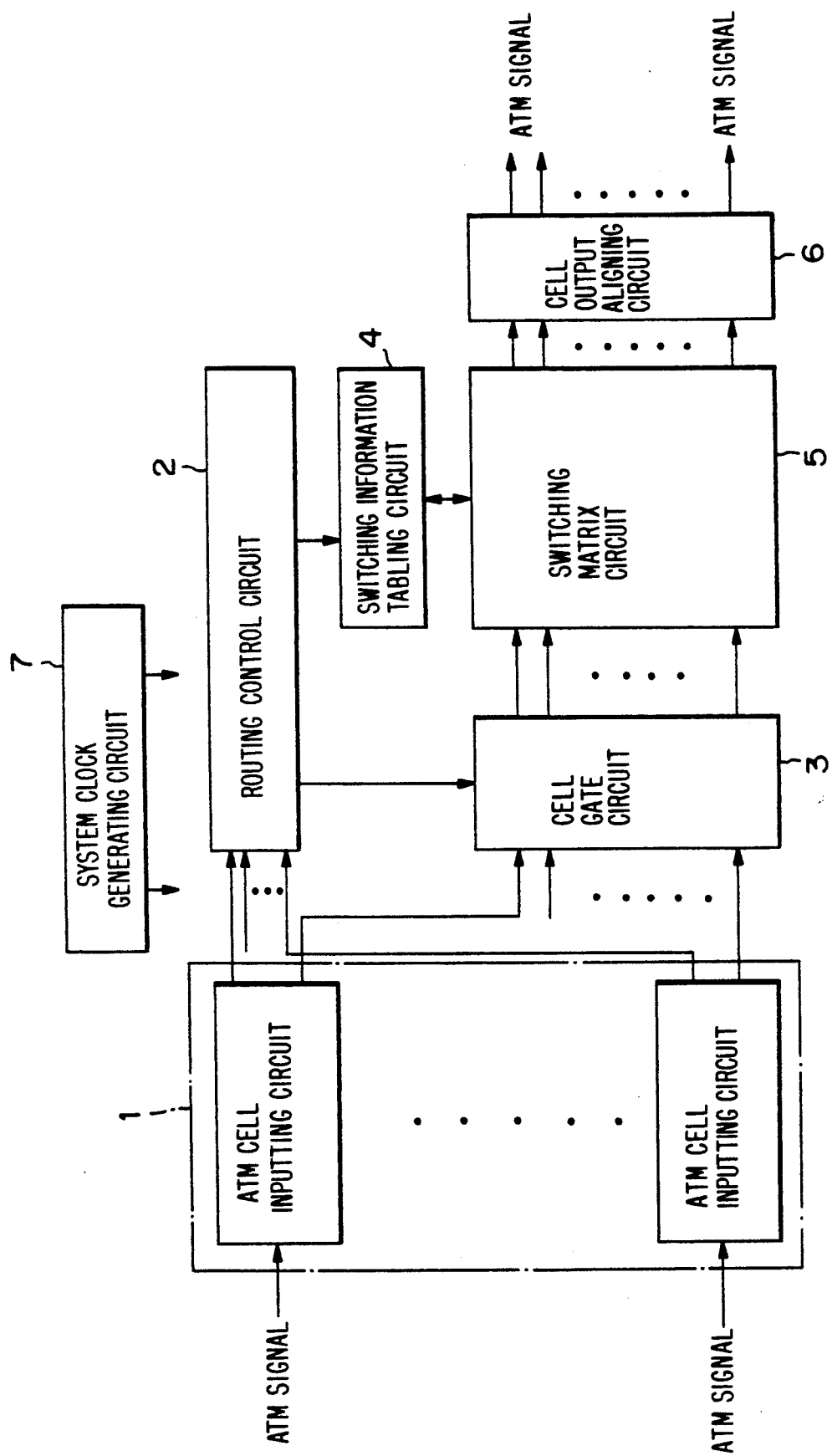
FIG. 1 is a block diagram which describes the schematic constitution of the present invention.

FIG. 1 is a block diagram schematically illustrating the constitution of the present invention. In this figure, reference code 1 indicates an ATM cell inputting circuit, reference code 2 indicates a routing control circuit, 3 a cell gate circuit, 4 a switching information tabling circuit, 5 a switching matrix circuit, 6 a cell output aligning circuit, and 7 a system clock generating circuit. As illustrated in FIG. 1, the high speed ATM cell which synchronizes the switching apparatus, includes: a plurality of ATM cell input circuits 1; a routing control circuit 2; a switching matrix circuit 5; a switching information table circuit 4 to switch the information between the routing control circuit 2 and the switching matrix circuit 5; and a cell gate circuit 3 for synchronous switching of the inputted cells (the above circuits 1,2 and 5 are the basic components). Furthermore, there are additional components: a cell output aligning circuit 6 for transmitting the outputted cells in accordance with the ATM transmission standard; and a system clock generating circuit 7 for supplying system clocks and cell synchronizing clocks to the whole system.

Figure 2:
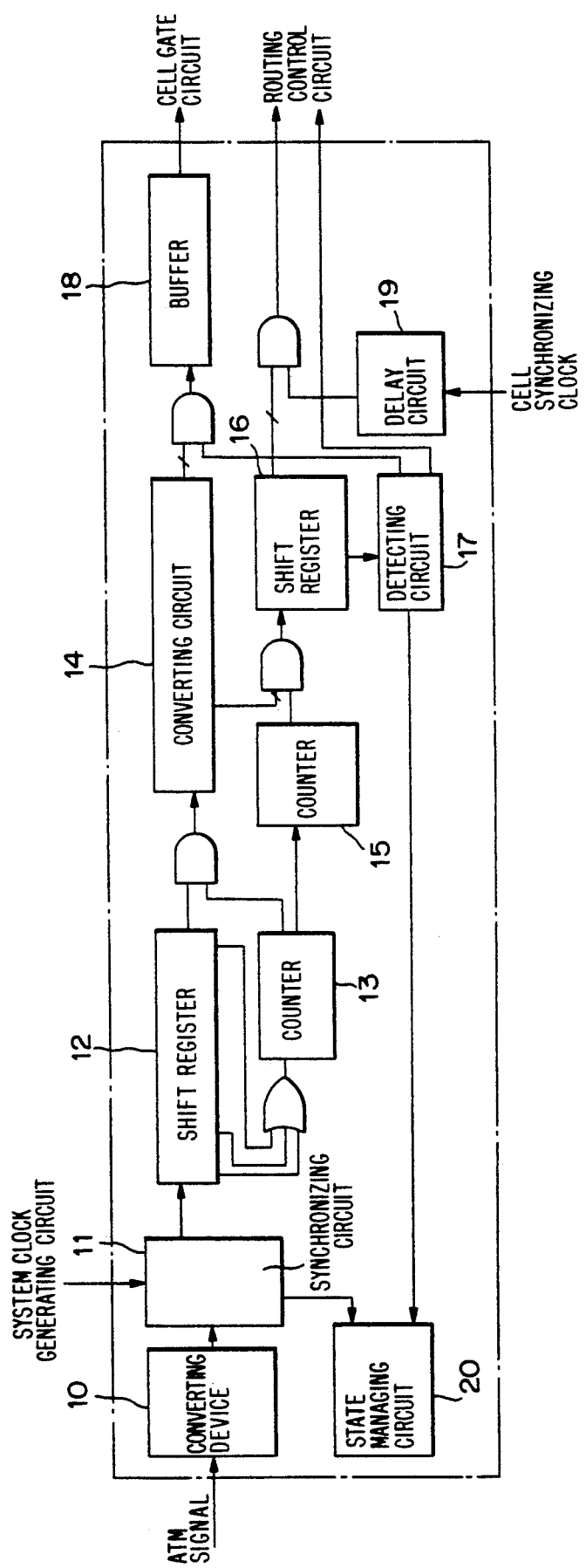
FIG. 2 is a block diagram which shows the constitution of the ATM cell input circuit.

FIG. 2 is a block diagram showing the constitution of the ATM cell input circuit according to the present invention. In this figure, the reference code 10 indicates an optical-electric converting device, 11 a bit timing synchronizing circuit, 12 a cell synchronizing shift register, 13 a cell synchronization counter circuit, 14 a serial/parallel converting circuit, 15 a header length counter, 16 a header storing shift register, 17 a valid cell detecting circuit, 18 a cell transmitting buffer, 19 a delay circuit, and 20 a state managing circuit.

As shown in FIG. 2, the ATM cell input circuit of the present invention includes: an optical-electric converting device 10, a bit timing synchronizing circuit 11, a cell synchronizing shift register 12, a cell synchronization counter circuit 13, a serial/parallel converting circuit 14, a header length counter 15, a header storing shift register 16, a valid cell detecting circuit 17, a cell transmitting buffer 18, a delay circuit 19, and a state managing circuit 20.

Now, the way of inputting ATM cells will be described based on the ATM cell inputting circuit 1.

The optical ATM signals, which are input in accordance with the ATM transmission standard, are converted to electronic signals by the optical-electric converting device 10. The electronic signals are input into the bit timing synchronizing circuit 11 where the system clocks are inputted from the system clock generating circuit 7, so that bit data can be extracted in synchronization with the system clock. Under this condition, if the bit timing synchronizing circuit 11 does not receive bit data, then this state is informed to the state managing circuit 20. The bit data received to the bit timing synchronizing circuit 11 are stored in the cell synchronizing shift register 12, and the beginning and end of the cell are confirmed through a field detecting logic circuit of the ATM cell header of the CCITT standard in interlock with the cell synchronizing counter circuit 13. Then, the cell is sent to the serial/parallel converting circuit 14. Under this condition, the cell synchronizing counter circuit 13 sends to the header length counter circuit 15 a signal informing of the beginning of the header of the cell, and extracts a header information from the cells stored in the serial/parallel converting circuit 14 before sending it to the header storing shift register 16.

The header storing shift register 16 sends to the valid cell detecting circuit 17 the information required for detecting the valid cell, and also sends to the routing control circuit 2 the address information required for the switching. Under this condition, the delay circuit 19 is used in order to synchronize the address information (sent to the routing control circuit 2) with the valid cell recognition signal of the valid cell detecting circuit 17.

Based on the header information stored in the header storing shift register 16, the valid cell detecting circuit 17 carries out a confirmation as to whether the cell stored in the serial/parallel converting circuit 14 is a valid cell or not, If it is a valid cell, the valid cell detecting circuit 17 sends the cell of the serial/parallel converting circuit 14 to the cell transmitting buffer 18 in synchronization with the address information of the routing control circuit 2. On the other hand, If it is invalid, the cell stored in the serial/parallel converting circuit 14 is discarded, and this fact is informed to the state managing circuit 20. In the meanwhile, the cell information stored in the cell transmitting buffer 18 is transferred to the cell gate circuit 3 in synchronization with the cell transmitting clock.

Figure 3:
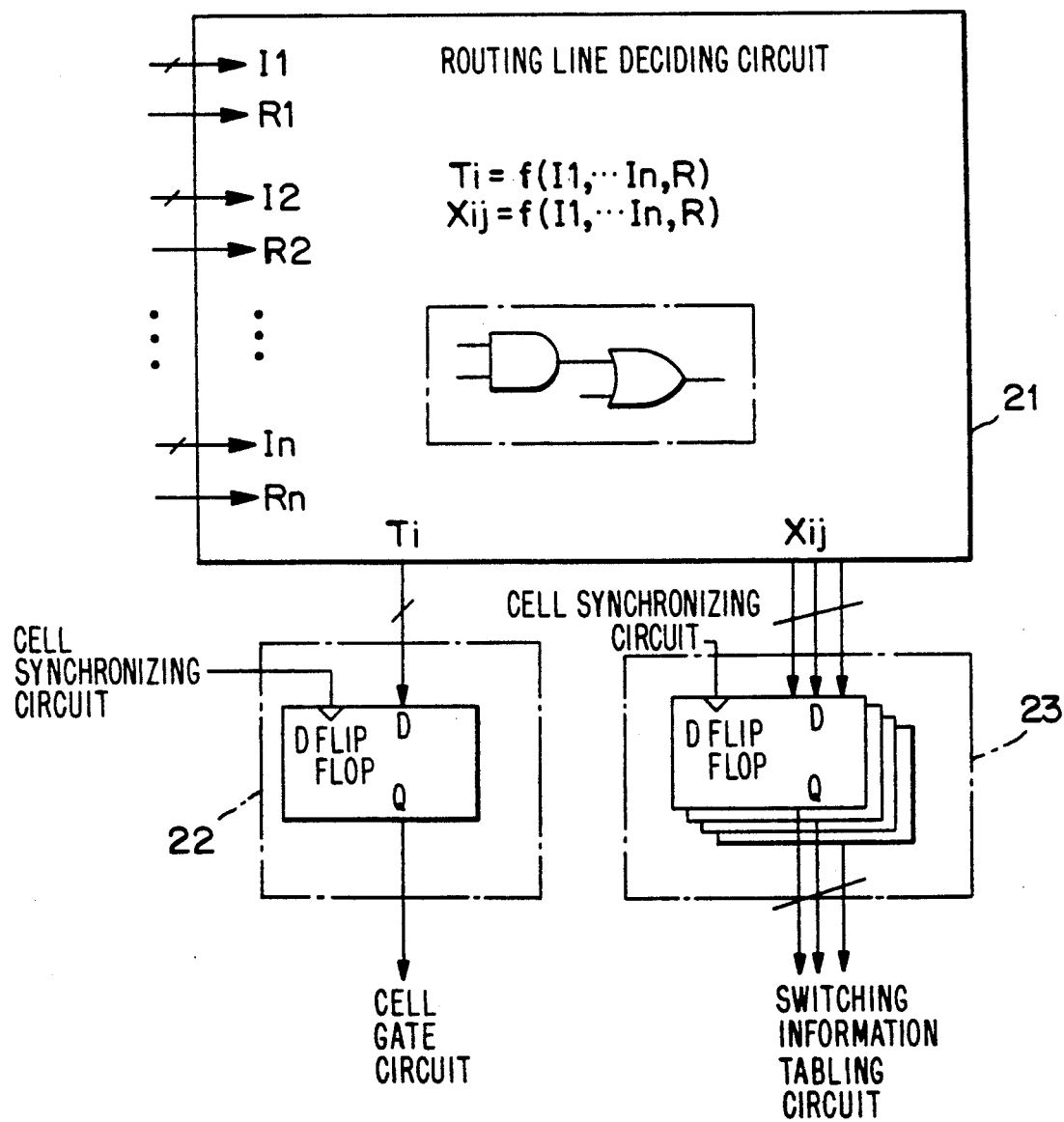
FIG. 3 is a block diagram which shows the constitution of the routing control circuit of the apparatus in FIG. 1.

FIG. 3 is a block diagram showing the constitution of the routing control circuit according to the present invention.

In this figure, reference code 21 indicates a routing line deciding circuit, 22 a line allocation responding circuit, and 23 a switch table setting circuit.

As shown in FIG. 3, the routing control circuit 2 according to the present invention includes: a routing line deciding circuit 21; a line allocation responding circuit 22 consisting of D flip-flops for receiving cell synchronizing clocks; and a switch table setting circuit 23 consisting of a plurality of D flip-flops for receiving cell synchronizing clocks.

When the parallel address information signals $I_1$-$I_n$, which are outputted after being extracted from the cells inputted from the header storing shift register 16 of the ATM cell inputting circuit 1, arrive at the routing line deciding circuit 21, and also when the valid cell recognition signals $R_1$-$R_n$, which inform of the validness of the output address of the valid cell detecting circuit 17, arrive at the routing line deciding circuit 21. Then, the routing line deciding circuit 21 sends the line allocation information $T_i$ to the line allocation responding circuit 22 through a proper routing deciding logic circuit. At the same time, the routing line deciding circuit 21 sends a control information $X_{ij}$ to the switch table setting circuit 23, and sends the line allocation information $T_i$ and the control information $X_{ij}$ to the switching information tabling circuit 4, so that the switching matrix on the relevant path should be controlled. Here, the line allocation responding circuit 22 and the switch table setting circuit 23 send commands to the cell gate circuit 3 and the switching information table circuit 4, so that the switching line can or could be connected according to the next cell synchronizing clock.

Figure 4:
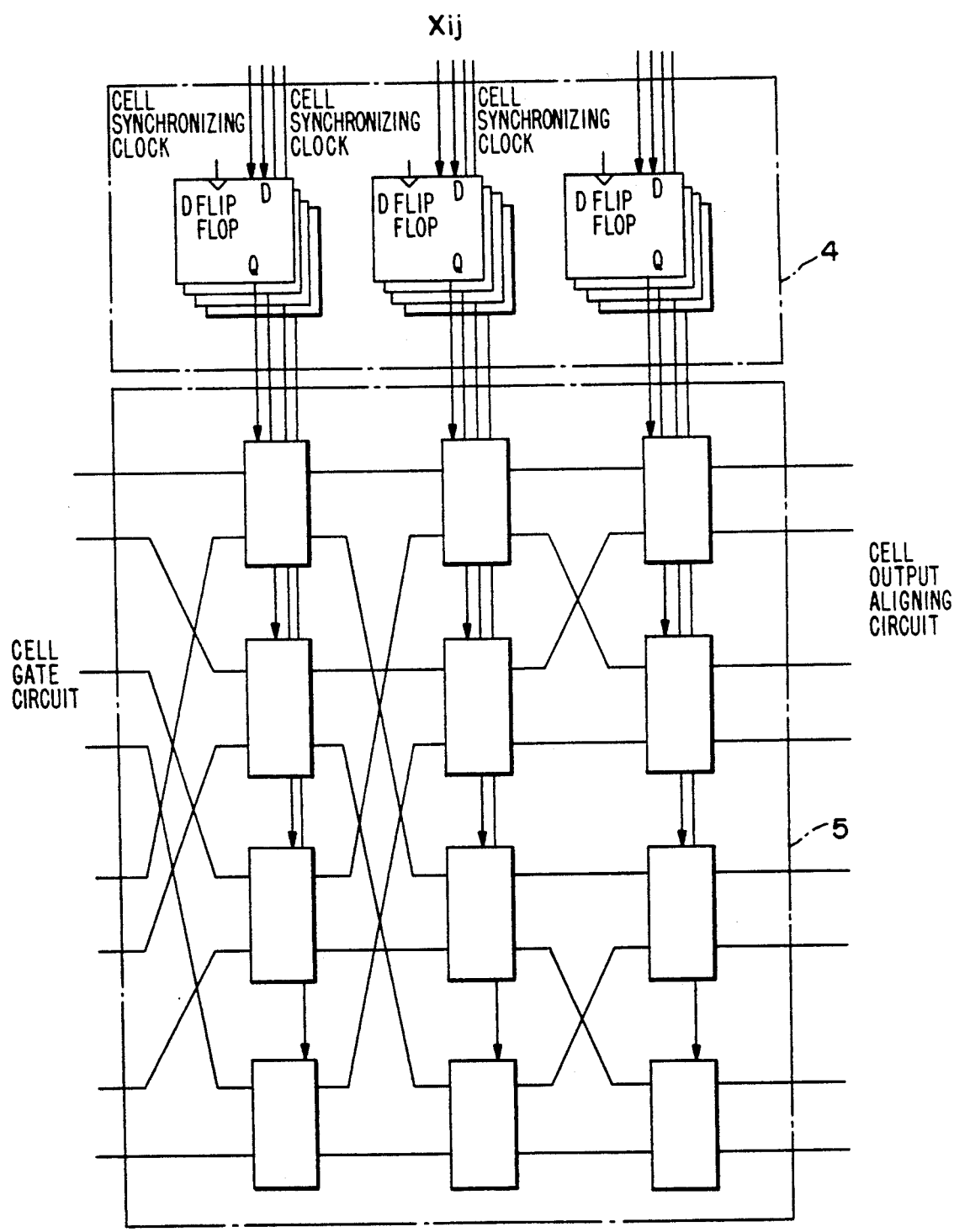
FIG. 4 is a block diagram which shows the constitutions of the switching information tabling circuit and the switching matrix circuit.

FIG. 4 is a block diagram showing the constitutions of the switching information tabling circuit and the switching matrix circuit. As shown in FIG. 4, the switching information tabling circuit 4 includes a plurality of D flip-flops, and it receives the information $X_{ij}$ (needed for switch-controlling) from the switch table setting circuit 23 of the routing control circuit 2. The switching information tabling circuit 4 stores the information $X_{ij}$ in order to control the respective switch boxes of the switch matrix in synchronization with the cell synchronizing clocks.

As an example of the switching matrix circuit 5, if the switching matrix takes the Banyan topology of a cubical form, the respective switch boxes of the switching matrix circuit receive cells from the cell gate circuit 3. If the control information is "0" in accordance with the switch control information, a serial connection is formed. However, if the switch control information is "1", a connection in an "X" shape is formed so that inputted cell can or could be sent to the relevant destination.

Figure 5:
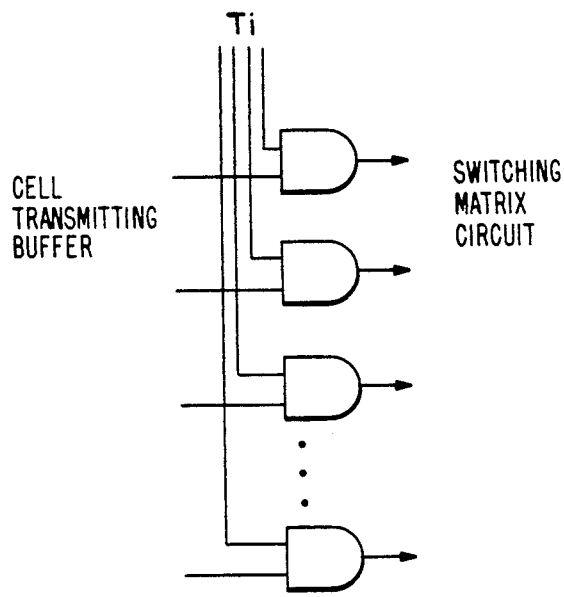
FIG. 5 is a circuital illustration which shows the constitution of the cell gate circuit of the apparatus in FIG. 1.

FIG. 5 is a circuital illustration showing the constitution of the cell gate circuit according to the present invention. As shown in FIG. 5, the cell gate circuit 3 consists of a plurality of AND gates which receives: the line allocating information $T_i$ outputted from the line allocation responding circuit 22 of the routing control circuit 2; and the cells stored in the cell transmitting buffer 18 of the ATM cell input circuit 1.

When a line connection is permitted from the line allocation responding circuit 22 of the routing control circuit 2, the cell gate circuit 3 line-connects in the form of a logic signal "1" to transmit it to the switching matrix circuit 5.

Figure 6:
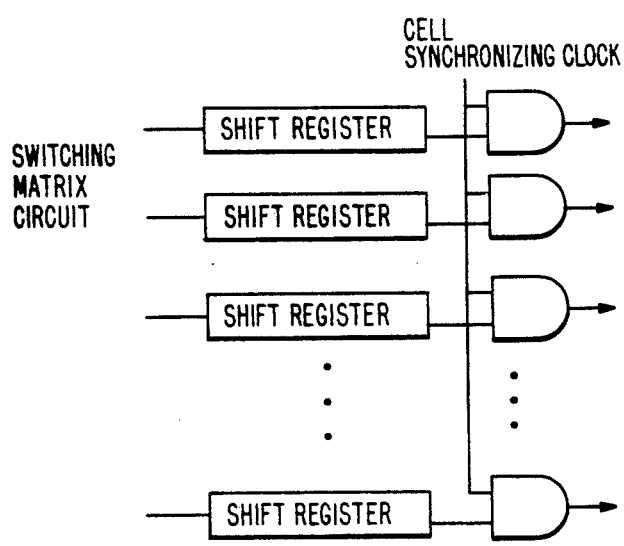
FIG. 6 is a circuital illustration which shows the constitution of the cell output aligning circuit of the apparatus in FIG. 1.

FIG. 6 is a circuital illustration showing the constitution of the cell output aligning circuit. As shown in this figure, the cell output aligning circuit 6 consists of: a plurality of shift registers; and a plurality of AND gates receiving the cell synchronizing clocks and the outputs of the above mentioned shift registers. The cell output aligning circuit 6 stores in the shift registers the switched cells supplied from the switching matrix circuit 5 so that the cells can be transmitted to the outside with corresponding to the regulated cell transmitting speed.

Figure 7:
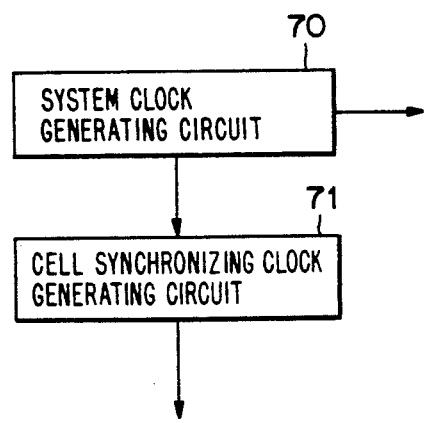
FIG. 7 is a block diagram which shows the constitution of the system clock generating circuit of the apparatus in FIG. 1.

FIG. 7 is a block diagram showing the constitution of the system clock generating circuit of the present invention. As shown in FIG. 7, the system clock generating circuit 7 supplies the system clocks and the cell synchronizing clocks to the whole system. It consists of a system clock generating circuit 70, and a cell synchronizing clock generating circuit 71 to receive clocks from the system clock generating circuit 70.

Figure 8:
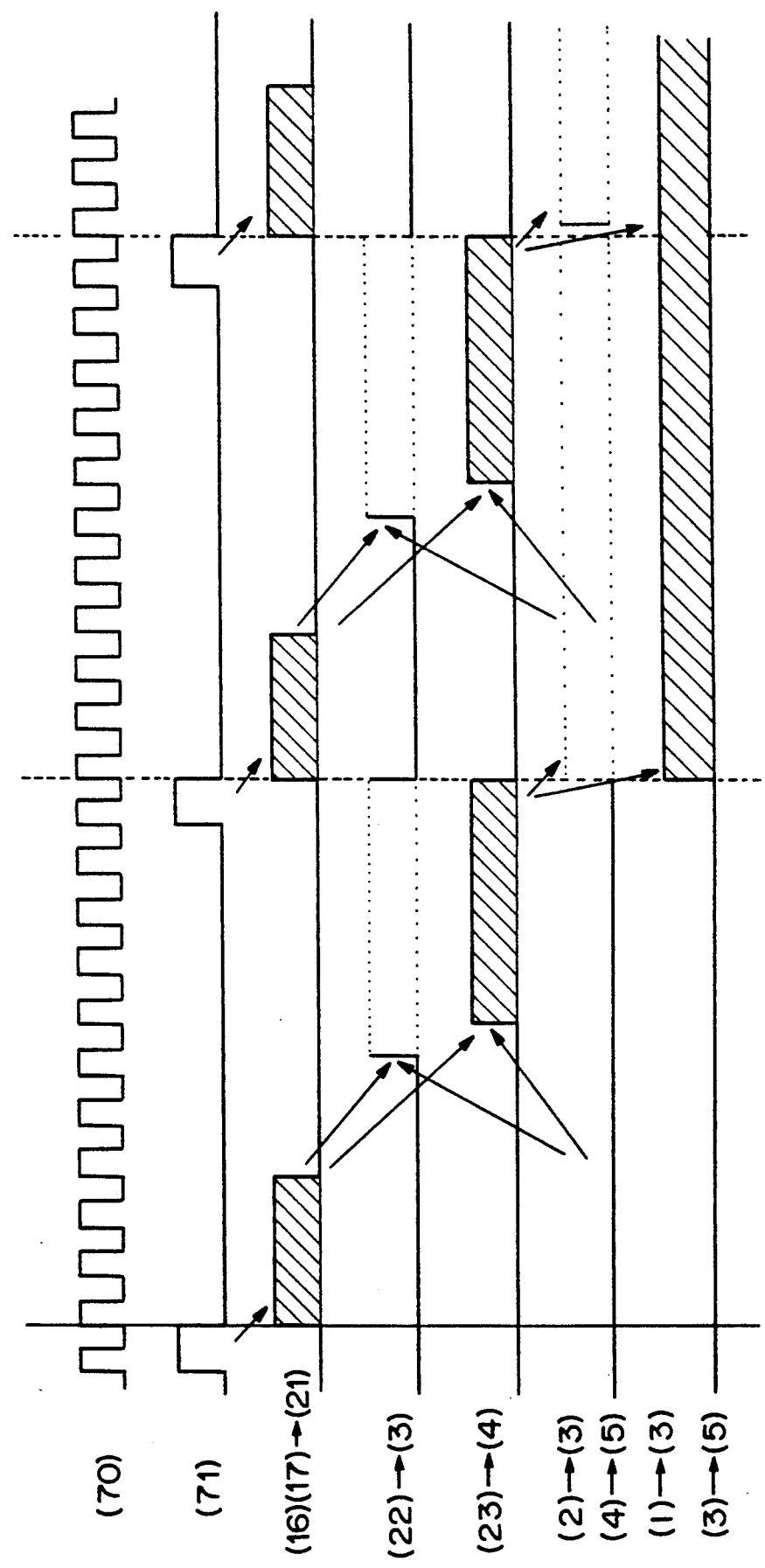
FIG. 8 is a timing chart which shows the timing between the blocks of the different circuits.

As shown in FIG. 8, the input of the cells by the allocation of the routing paths is carried out as the following. The ATM cell, for which the routing line is decided during the preceding cell synchronizing clock, is outputted by the allocation to the proper path of the switching matrix circuit 5 in synchronization with the next cell synchronizing clock.

Figure 9:
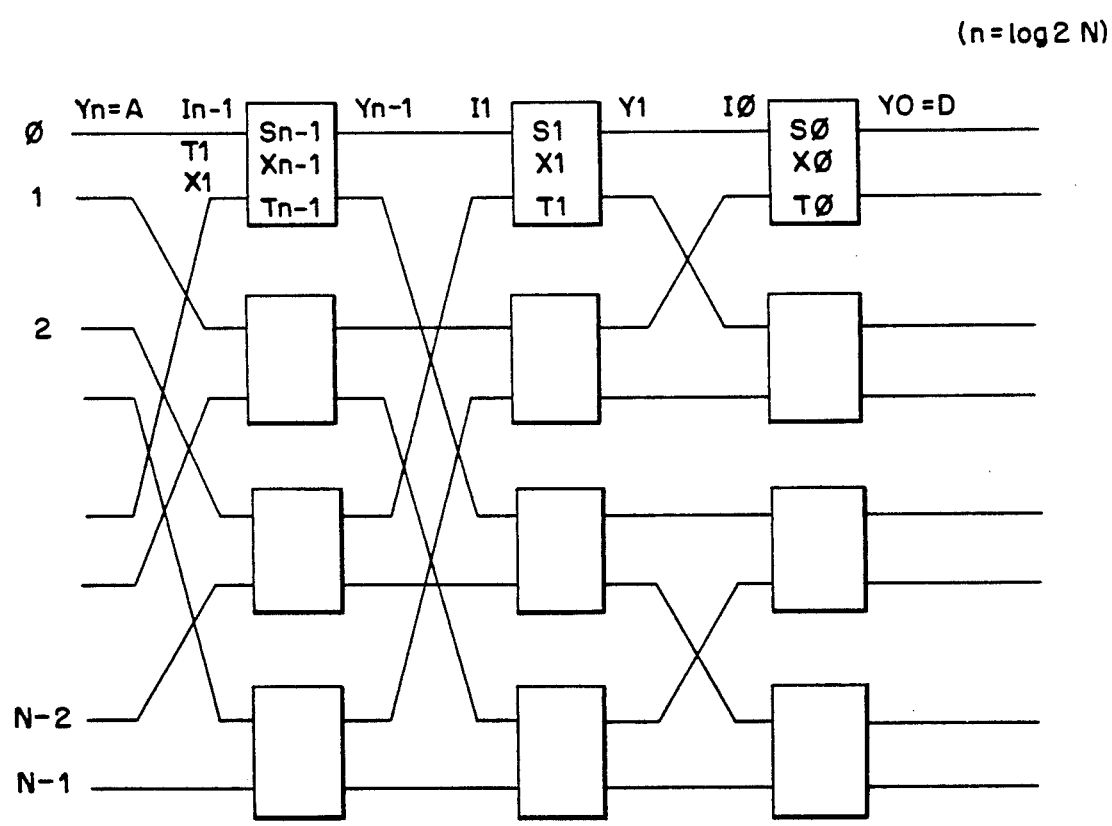
FIG. 9 examplarily illustrates the switching model for logic-deciding the routing line.

FIG. 9 examplarily illustrates a switching model for logic-deciding the routing line. If the switching matrix circuit 5 takes a Banyan topology of cubical form, then the algorithm for calculating the control information $X_{ij}$ and the line allocation information $T_i$ of the routing line deciding circuit 21 can be explained as the following referring to FIG. 9. The number of input ports of the switch network is denoted by N, the input address by $A=(a_{n-1}, a_{n-2}, \ldots a_0)$, and the output address by $D=(d_{n-1}, d_{n-2}, \ldots d_0)$. When the input address A is to transmit cells, the transmission requesting signal rA is set to be "1". Also, each of the respective input addresses, output addresses of the switch boxes at stage i is represented by $I_i$, $Y_i$ and $X_i$ respectively. Here, $X_i$ is calculated by exclusive OR of the output address D and the input address A passing through the relevant stage. As the line control functions at state i, there are $S_i$ representing the switch box number at stage i, $X_i$ representing the connection command of switch box $S_i$, and $T_i$ deciding the connection of the line inputted into the switch box $S_i$.

If $X_i$ representing the connection command of the switch box $S_i$ is "0", a serial connection is formed, and if it is "1", a switching connection in an X form is formed. If $T_i$, which decides the connection of the inputted line of the switch box $S_i$ is "1", a connected path is provided. If it is "0", the connection path is blocked. The switch box number $S_i$ is calculated by the following formulas.

$$S_{n-1} = S_f(n-1) = S_f[R_1(A)]$$

$$S_i = S_f(I_i) = S_f[R_1(Y_i+1)]$$

In the above formulas, $R_1(*)$ is an arithmetic operator which performs the function of rotating the binary address to the left by one bit, and $S_r(*)$ is an arithmetic operator which performs the function of shifting the binary address to the right. Meanwhile, $Y_i$ can be defined as follows.

$$Y_i = M_1 S_b(I_i, X_i)$$

In the above formula, the output address $Y_i$ is valid only when there is no cell inputted in an even number(- that is, when the inputted cell $I_i$ into the switch box is an odd number), or when the switch request signal $X_i$ corresponds with switch box connection request signal by the relevant cell with the existence of an inputted cell in an even number. Meanwhile, $M_1 S_b(I,X)$ is an arithmetic operator for putting the least significant bit of the address I to an exclusion OR as against X. When an even numbered cell is inputted into the switch box, the switch box connecting signal $X_i$ is decided by the connecting signal $X_i$ of the relevant cell. When there is no even numbered cell inputted, but when there are only odd numbered cells, the switch box connecting signal $X_i$ is decided by the switching signal requested by the odd number. At the stage i, when the cells are inputted into the switch box as an even number, the line allocation deciding signal $T_i$ is always "1". However, if they are inputted as an odd number, and thus if they do not correspond with the even numbered cell switch connecting signals, then the line allocation deciding signal $T_i$ becomes "0", thereby denying the connection path allocation request. It can be assumed that $T_i$ among the results of the routing line deciding circuit is a line allocation deciding signal for the ith inputted address. Therefore, if $T_i$ which is the line allocation deciding signal at the stage i for passing the relevant inputted cell is logic "1", $T_i$ commands the line allocation. Furthermore, when i in $X_{ij}$ represents the stage number and j represents the switch box number, the relation $j=S_i$ is formed. Under this condition, the connecting signal $X_{ij}$ for the jth switch box is given by the above described switch box connecting signal $X_i$.

The apparatus of the present invention with the above operation brings the following effects. First, the address information to allocate the respective routing paths for the cells inputted through the respective cell inputting circuits decides the routing lines in synchronization with the cell synchronizing clock, and a transitional state does not occur during the process of allocating the routing paths, making it easy to design the routing circuit. Moreover, the routing path deciding time is not sensitive to the variation of the processing time, but the decision has only to be made within one cell synchronizing clock.

Secondly, the routing path control circuit and the switch matrix control circuit are separated each other by using a switching information table, so that, in principle, the routing allocation algorithm should not have any relation to the constitution of the switch matrix. Thirdly, there is not any inserted protocol for the internal routing into the inputted ATM cell. Therefore, the inputted cells are transmitted to the output terminal in the same original form.

Fourthly, the cell switching is carried out by the cell gate circuit in synchronization with the cell synchronizing clock. Therefore, no collision of cells within the switch matrix occurs.

Fifthly, the routing control path and the switch matrix circuit are separated from each other. Therefore, there is required no task of allocating the paths of the switch matrix for each cell when the traffic occupies the switching line for a long time as in the TV traffic.

Sixthly, not only the bilateral switching service, but also the distribution service such as the TV and video distribution service becomes possible only by setting the switching information table for the relevant paths.

What is claimed are:

1. A high speed ATM cell synchronizing switching apparatus having a switching memory comprising:

a system clock generating means (7) for supplying system clocks and cell synchronizing clocks;

a plurality of ATM cell inputting means (1) for receiving optical ATM signals;

a routing control means (2) connected to the plurality of said ATM cell inputting means (1) for receiving address information from the plurality of said ATM cell inputting means (1);

a cell gate means connected to both the plurality of said ATM cell inputting means (1) and said routing control means (2) for transmitting the inputted cells from the plurality of said ATM cell inputting means (1) in synchronization with the cell synchronizing clocks;

a switching information table means (4) connected to said routing control means (2) for receiving a switching table setting information and for outputting a switching control information; and a switching matrix means (5) connected to both said switching information table means (4) and said cell gate means (3) for receiving the switching control information and for outputting a cell data information, wherein the system clock generating means (7) supplies system clocks and cell synchronizing clocks to said routing control means (2), said cell gate means (3), said switching information table means (4), and said switching matrix means (5), and wherein said ATM cell inputting means (1) comprises: an optical-electric converting means (10) for converting the received optical ATM cells to electronic signals; a bit timing synchronizing means (11), connected to the optical-electric converting means (10), for extracting the bit information in synchronization with the system clock of the system clock generating means (7); a cell synchronizing shift register means (12), connected to the bit timing synchronizing means (11), for storing the bit information; a cell synchronizing counter means (13), connected to the cell synchronizing shift register (12), for controlling the transmissions of the cells stored in said cell synchronizing shift register means (12); a serial/parallel converting means (14) for receiving the stored cells of the cell synchronizing shift register (12) in accordance with the controls of the cell synchronizing counter means (13); a header length counter means (15) connected to the cell synchronizing counter means (13) for extracting the header information from the stored cells of the serial/parallel converting means (14); a header storing shift register means (16) for receiving the header information from the stored cells of the serial/parallel converting means (14) in accordance with the controls of the header length counter means (15); a valid cell detecting means (17) for supplying a valid cell recognition signal to said routing control means (2) by checking whether the stored cell of said serial/parallel converting means (14) is valid or not, based on the header information of the header storing shift register means (16), the valid cell detecting means (17) connected to the header storing shift register (16); a cell transmission buffering means (18) for transmitting the cells to the cell gate means (3), after receiving the cells from the serial/parallel converting means (14) in accordance with the controls of the valid cell detecting means (17); a delay means (19) for transmitting the address information of the header storing shift register (16) to the routing control means (2) by controlling the header storing shift register (16) after receiving the cell transmitting clock from the system clock generating means (7); and a state managing means (20), connected to both of the bit timing synchronizing means (11) and the valid cell detecting means (17), for receiving the line blocking signals and the invalid cell recognition signals.

2. A high speed ATM cell synchronizing switching apparatus having a switching memory, comprising:

a system clock generating means (7) for supplying system clocks and cell synchronizing clocks;

a plurality of ATM cell inputting means (1) for receiving optical ATM signals;

a routing control means (2) connected to the plurality of said ATM cell inputting means (1) for receiving address information from the plurality of said ATM cell inputting means (1);

a cell gate means connected to both the plurality of said ATM cell inputting means (1) and said routing control means (2) for transmitting the inputted cells from the plurality of said ATM cell inputting means (1) in synchronization with the cell synchronizing clocks;

a switching information table means (4) connected to said routing control means (2) for receiving a switching table setting information and for outputting a switching control information; and a switching matrix means (5) connected to both said switching information table means (4) and said cell gate means (3) for receiving the switching control information and for outputting a cell data information, wherein said routing control means (2) comprises: a routing line deciding means (21) for receiving address signals $I_1$-$I_n$ and routing request information $R_1$-$R_n$ from said ATM cell inputting means (1); a line allocation responding means (22) connected to the routing line deciding means (21) for transmitting the line allocation information $T_i$ to said cell gate means (3); and a switch table setting means (23) connected to the routing line deciding means (21) for transmitting the switch table allocation information $X_{ij}$ to the switching information table means (4).

3. A high speed ATM cell synchronizing switching apparatus having a switching memory as claimed in claim 1 or claim 2, wherein said switching matrix means (5) comprises a plurality of switch boxes using cubical Banyan topology.

4. A high speed ATM cell synchronizing switching apparatus having a switching memory as claimed in claim 3, wherein said cell gate means (3) comprises a plurality of AND gates which receive, as the input thereof, the cell data information of said ATM cell inputting means (1) and the line allocation information $T_i$ of said routing control means (2), and which send the output thereof through said switching matrix means (5).

5. A high speed ATM cell synchronizing switching apparatus having a switching memory, comprising:

a system clock generating means (7) for supplying system clocks and cell synchronizing clocks;

a plurality of ATM cell inputting means (1) for receiving optical ATM signals;

a routing control means (2) connected to the plurality of said ATM cell inputting means (1) for receiving address information from the plurality of said ATM cell inputting means (1);

a cell gate means connected to both the plurality of said ATM cell inputting means (1) and said routing control means (2) for transmitting the inputted cells from the plurality of said ATM cell inputting means (1) in synchronization with the cell synchronizing clocks;

a switching information table means (4) connected to said routing control means (2) for receiving a switching table setting information and for outputting a switching control information; and a switching matrix means (5) connected to both said switching information table means (4) and said cell gate means (3) for receiving the switching control information and for outputting a cell data information, wherein the system clock generating means (7) supplies system clocks and cell synchronizing clocks to said routing control means (2), said cell gate means (3) said switching information table means (4), and said switching matrix means (5), and further comprising a cell output aligning means (6) connected to said switching matrix means (5) for transmitting respective switch-destined cell data in accordance with the ATM cell transmission standard recommended by the CCITT international standards organization, wherein said cell output aligning means (6) comprises: a plurality of shift registers for storing temporarily the switched cells outputted from said switching matrix means (5); and a plurality of AND gates for receiving the stored cells of the plurality of the shift registers and the cell synchronizing clocks of the system clock generating means (7).

* * * * *